United States Patent [19]

Grigoletti

[11] Patent Number: 5,605,621

[45] Date of Patent: *Feb. 25, 1997

[54] UNLOADING DEVICE FOR FILTER PRESS

[76] Inventor: Franco Grigoletti, Via Acquacalda 27, 48022 Lugo (Prov. of Ravenna), Italy

[ * ] Notice: The terminal 19 months of this patent has been disclaimed.

[21] Appl. No.: 10,041

[22] Filed: Jan. 28, 1993

[30] Foreign Application Priority Data

Feb. 6, 1992 [IT] Italy .................. BO92A0034

[51] Int. Cl.$^6$ .............................................. B01D 25/34
[52] U.S. Cl. ........................ 210/91; 210/225; 210/229; 210/230; 100/198
[58] Field of Search .................. 210/225, 227, 210/229, 230, 91; 100/198

[56] References Cited

U.S. PATENT DOCUMENTS

| | | | |
|---|---|---|---|
| 2,932,399 | 4/1960 | Emele | 210/225 |
| 3,289,844 | 12/1966 | Emele | 210/225 |
| 4,491,519 | 1/1985 | Kurita | 210/225 |
| 4,710,293 | 12/1987 | Davis | 210/225 |
| 5,133,884 | 7/1992 | Carlsson | 210/225 |
| 5,167,801 | 12/1992 | Kawasaki | 100/198 |

FOREIGN PATENT DOCUMENTS

| | | |
|---|---|---|
| 2175039 | 10/1973 | France . |
| 2543449 | 10/1984 | France . |
| 1813792 | 5/1970 | Germany . |
| 73511 | 5/1993 | Japan .................. 210/230 |

*Primary Examiner*—Matthew O. Savage

[57] ABSTRACT

The unloading device for filter press has upper means for supporting a series of filtering cloths which are associated with the opposite front surfaces of a corresponding series of plates arranged in a pack, the plates being compressible between a fixed head and a movable head, whereby to form a succession of filtration chambers into which the liquid to be filtered is fed. The supporting means are vertically movable between a raised filtration position, in which the filtering cloths are stretched, and a lowered unloading position, wherein an upper portion of the cloths forms a fold which is able to facilitate the separation of the bricks formed by the solid filtration residues. The unloading position corresponds to a limited opening of the filtration chambers.

10 Claims, 4 Drawing Sheets

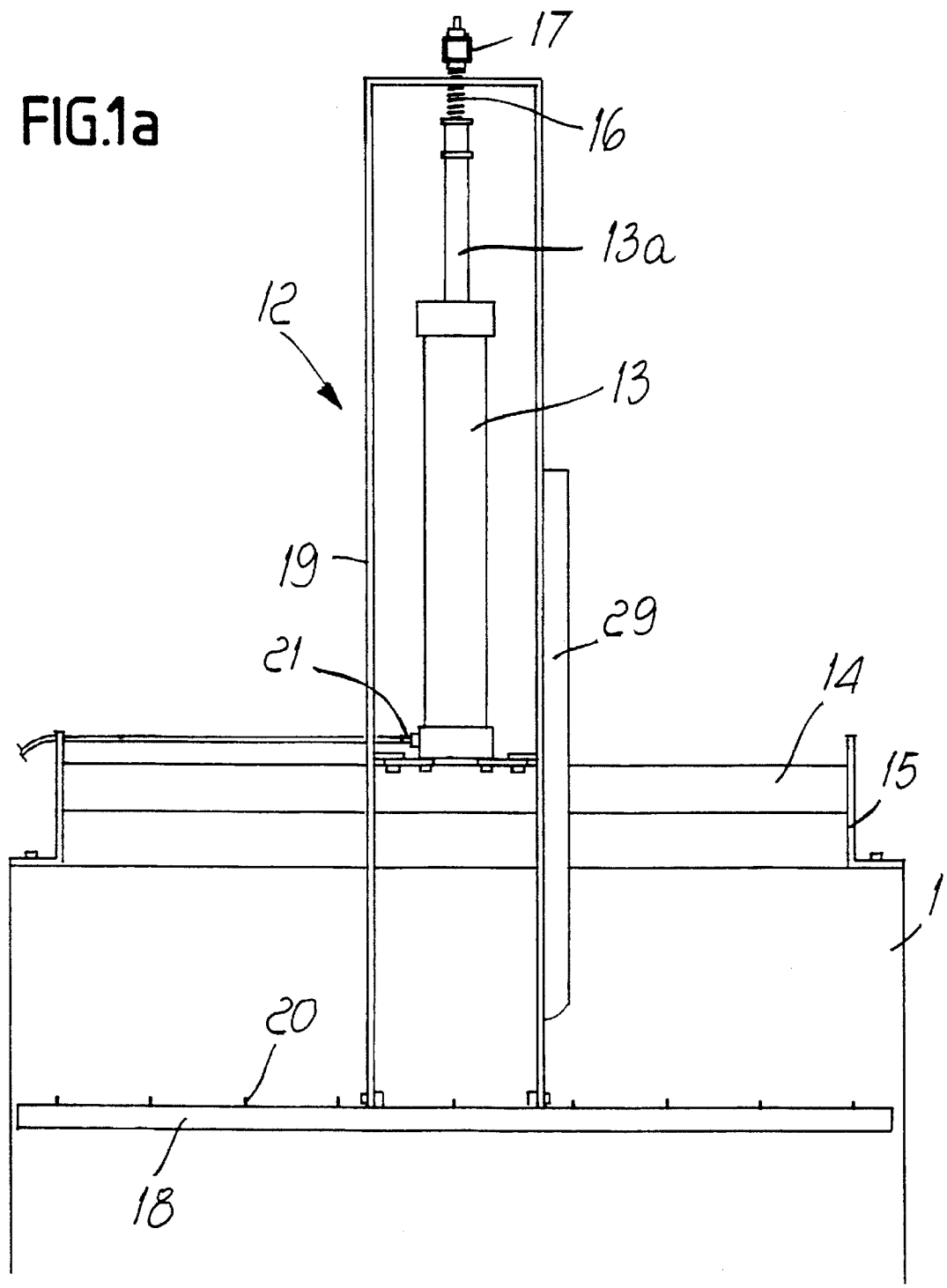

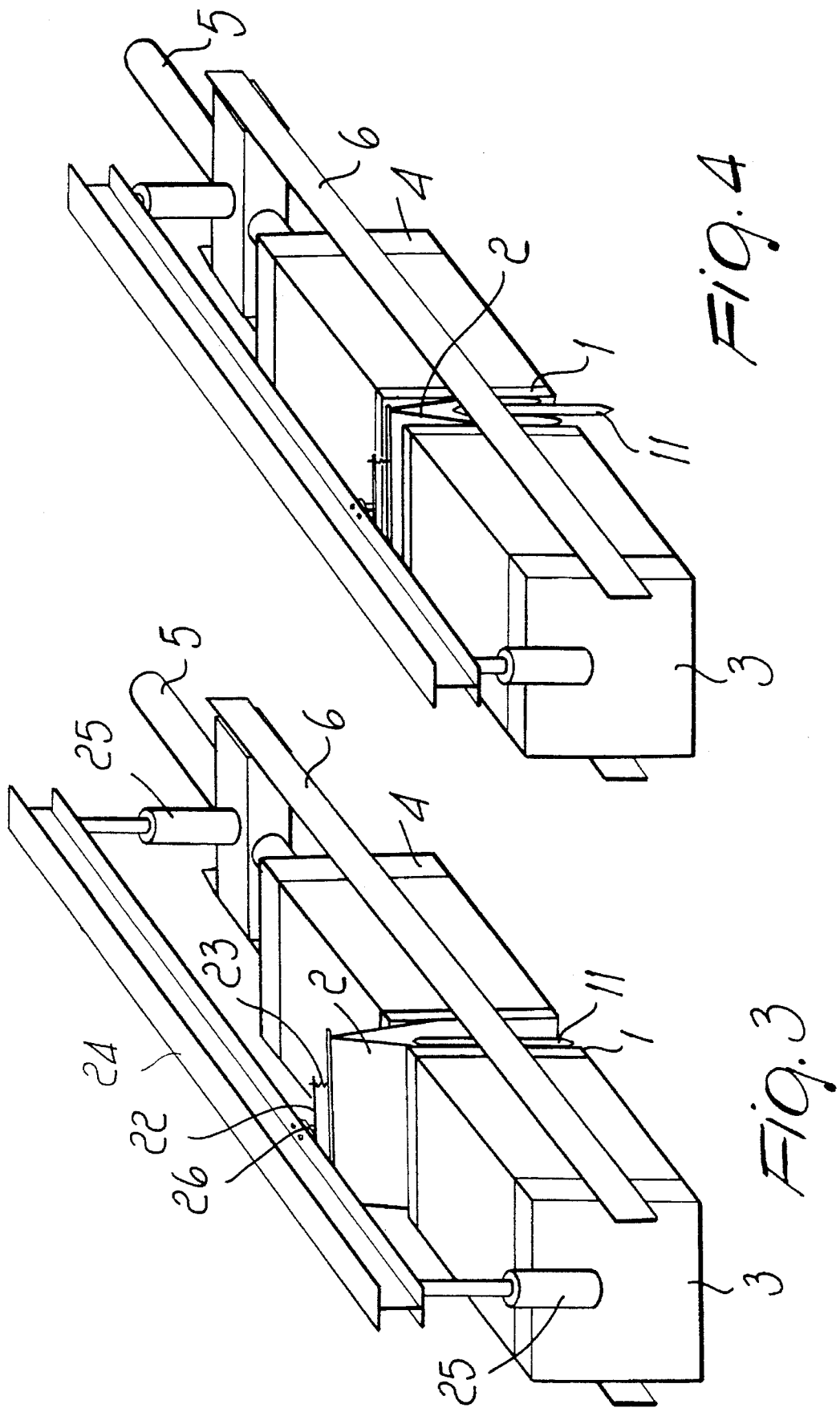

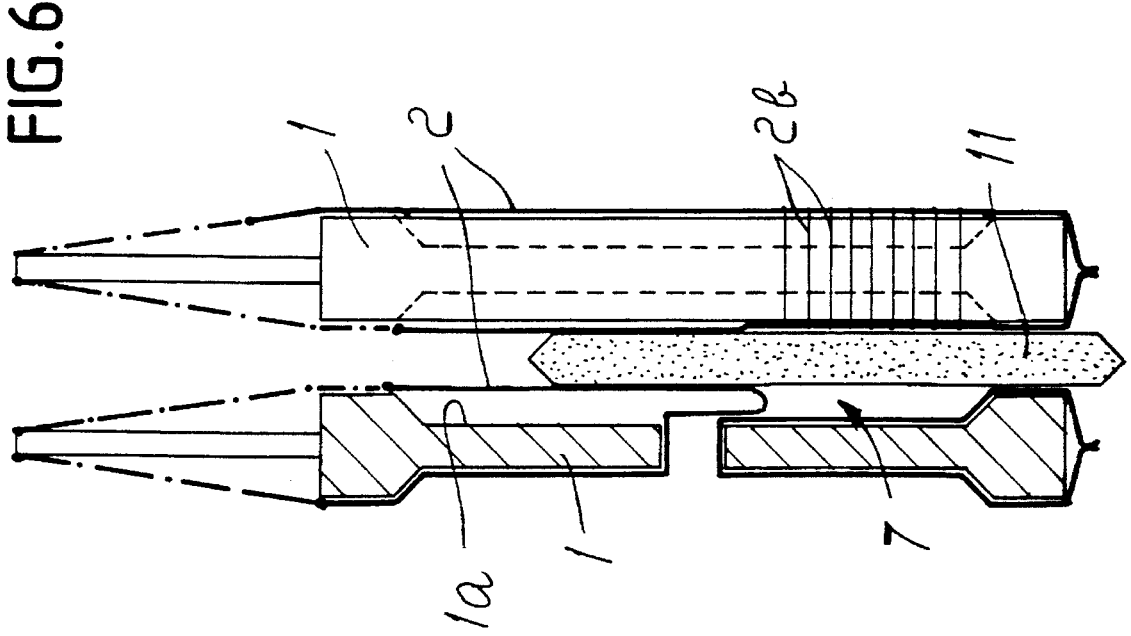
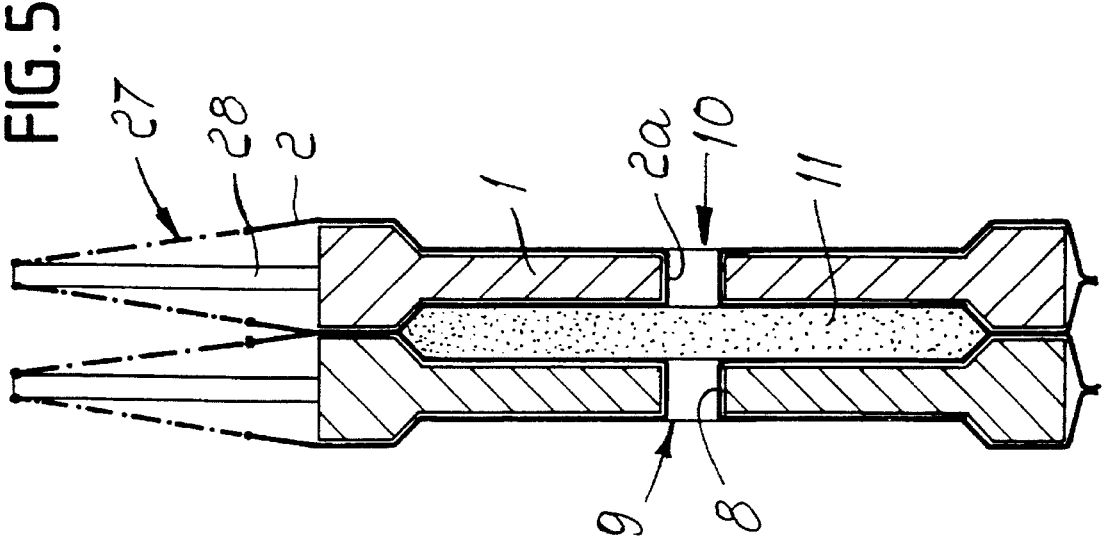

UNLOADING DEVICE FOR FILTER PRESS

BACKGROUND OF THE INVENTION

The present invention relates to an unloading device for filter press.

It is known that filter presses are used to filter liquid substances; said filter presses are constituted in practice by a series of plates which are recessed in a central region and are arranged in a pack; respective elements made of filtering cloth are interposed between said plates, so as to form a succession of chambers into which the liquid to be filtered is fed. The plates and the associated cloths have corresponding holes forming, upon assembly, a duct which is used to feed the liquid to be filtered; in order to prevent the cloths from clinging to the plates, during filtration, said plates are provided with respective grooves which also facilitate the flow of the filtrate toward the lower part, wherefrom the flow is drawn by means of appropriate channels.

The pack of plates is pressed between a fixed head and a movable head by means of a suitable jack which acts axially with respect to said pack. For this purpose, the plates are slidably supported on opposite lateral guides arranged horizontally parallel to each other and appropriately rigidly coupled to the fixed head.

In a widespread embodiment, a single filtering cloth is folded on the upper edge of each plate so as to descend on the opposite sides thereof and cover its respective front surfaces. The fabric is furthermore tightly fitted to the plate by appropriate laces which are tied at the sides of said plate. Sometimes, however, there are two separate cloths which are applied on the opposite surfaces of each plate and are rigidly coupled to one another by lateral laces. The filtering cloths can furthermore be suspended from an upper support by appropriate elastic means ensuring the appropriate tension.

Filtering cloths are also known which are formed by two distinct elements which are mutually coupled by a collar intended to enter said hole of the plate. Said cloths are obviously perforated at said collar.

The solid residue filtered from the liquid is collected in the above mentioned chambers defined between the adjacent plates, until it forms a sort of brick or cake. Said brick is in contact with respective filtering cloths on its opposite surfaces.

It therefore becomes necessary to periodically unload from the filter press the bricks formed by the filtration residues. This operation is generally performed by mutually spacing the plates, by virtue of the sliding of the movable head, so as to open the filtration chambers and allow the falling out of said bricks due to gravity.

Sometimes, however, the bricks do not separate, due to the force of adhesion to the filtering cloths, thus requiring the intervention of an operator who manually performs an appropriate mechanical action. This obviously entails a significant limitation to the productivity of the filter press.

Furthermore, in order to allow manual intervention for cleaning it is necessary to provide a wide opening of the chambers, i.e. a considerable mutual spacing of the plates. This leads to a correspondingly large bulk of the filter press and to the need to use an expensive opening jack.

In order to obviate this problem, various unloading devices have been provided which are intended, for example, to impart a reciprocating motion to the bricks in order to facilitate their separation. However, these devices are generally complicated and do not ensure complete separation of the bricks.

SUMMARY OF THE INVENTION

The aim of the present invention is to solve the above problem by providing a device which allows to safely and rapidly unload from the filter press the bricks formed by the filtration residues, without requiring manual interventions and with a limited opening of said filter press.

Within the scope of this aim, an object of the present invention is to provide an unloading device for filter press which is simple in concept, safely reliable in operation and versatile in use.

This aim and these objects are achieved, according to the invention, by the present unloading device for filter press, comprising a series of plates arranged in a pack, said plates being compressible between a fixed head and a movable head, whereby to form a succession of filtration chambers into which the liquid to be filtered is fed, and a corresponding series of filtering cloths associated with said plates, whereby to cover opposite front surfaces of said plates, said device being characterized in that it has upper means for supporting said filtering cloths which are vertically movable between a raised filtration position, in which said cloths are stretched, and a lowered unloading position, wherein an upper portion of said cloths forms a fold which facilitates separation of the bricks formed by the solid residues of filtration of said liquid, said unloading position corresponding to a limited opening of said filtration chambers.

BRIEF DESCRIPTION OF THE DRAWINGS

The details of the invention will become apparent from the detailed description of a preferred embodiment of the unloading device for filter press, illustrated only by way of non-limitative example in the accompanying drawings, wherein:

FIG. 1a is a corresponding front view of a modified embodiment of said device;

FIGS. 3 and 4 are respectively perspective views of a filter press provided with an unloading device provided in a different form, in successive positions of the unloading step;

FIGS. 5 and 6 are transverse sectional views of a filtration chamber, illustrating a further embodiment of the unloading device, with cloth return by virtue of spring means, respectively during filtration and during unloading.

DESCRIPTION OF THE PREFERRED EMBODIMENTS

Figure 2:
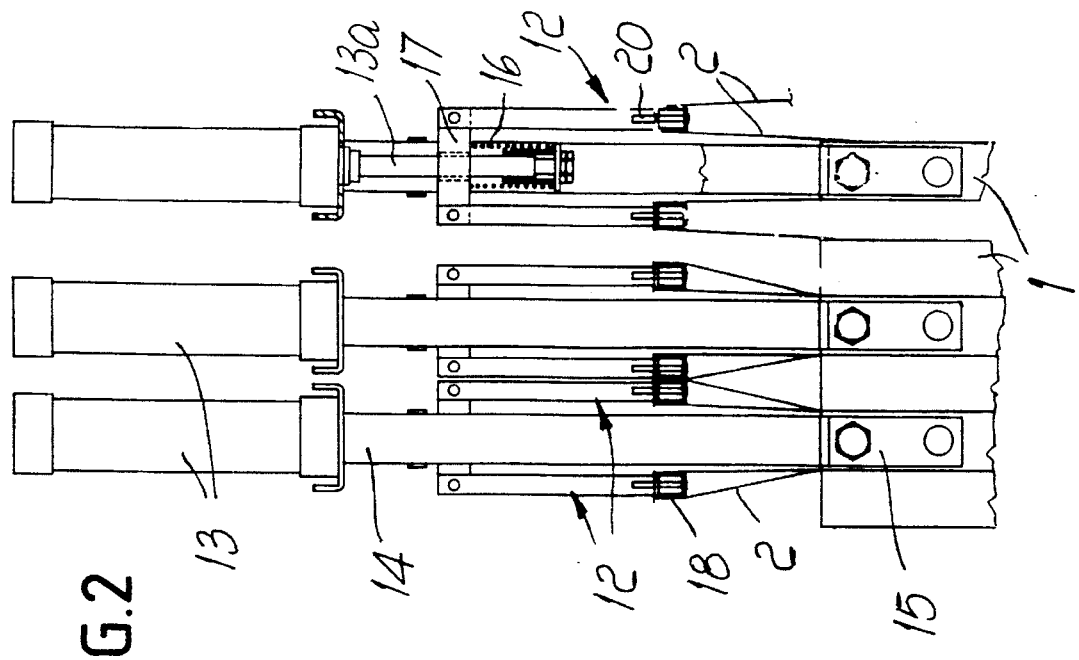
FIG. 2 is a side view thereof.

With particular reference to the above figures, the reference numeral 1 designates the plates of a known filter press. A pair of filtering cloths 2 is associated with each plate 1; said cloths are able to respectively cover the opposite front surfaces of said plate.

The plates 1 are arranged in a pack and are able to be pressed between a fixed head 3 and a movable head 4 upon the actuation of a jack 5 which acts axially with respect to said pack. For this purpose, the plates 1 are slidably supported on opposite lateral guides 6 which are arranged horizontally, parallel to each other and are appropriately rigidly coupled to a frame of which the fixed head 3 is a part.

The plates 1 are bilaterally recessed in a central region 1a, so as to form, when they are mutually pressed together, a succession of chambers 7 into which the liquid to be filtered is fed.

The plates 1 and the filtering cloths 2 which are associated therewith have corresponding holes 8 and 9 which are able to form, upon assembly, a duct 10 which is used to feed the liquid to be filtered. At the holes 9, the cloths 2 are rigidly coupled by a collar 2a which covers, in the assembly position, the hole 8 of the related plate 1.

The filtering cloths 2 of each plate 1 are furthermore mutually fastened by means of laces 2b which are tied at the sides of said plate below the plane defined by the duct 10 and at its lower side.

Respective bricks 11 form during filtration in the chambers 7 of the filter press.

Figure 1:
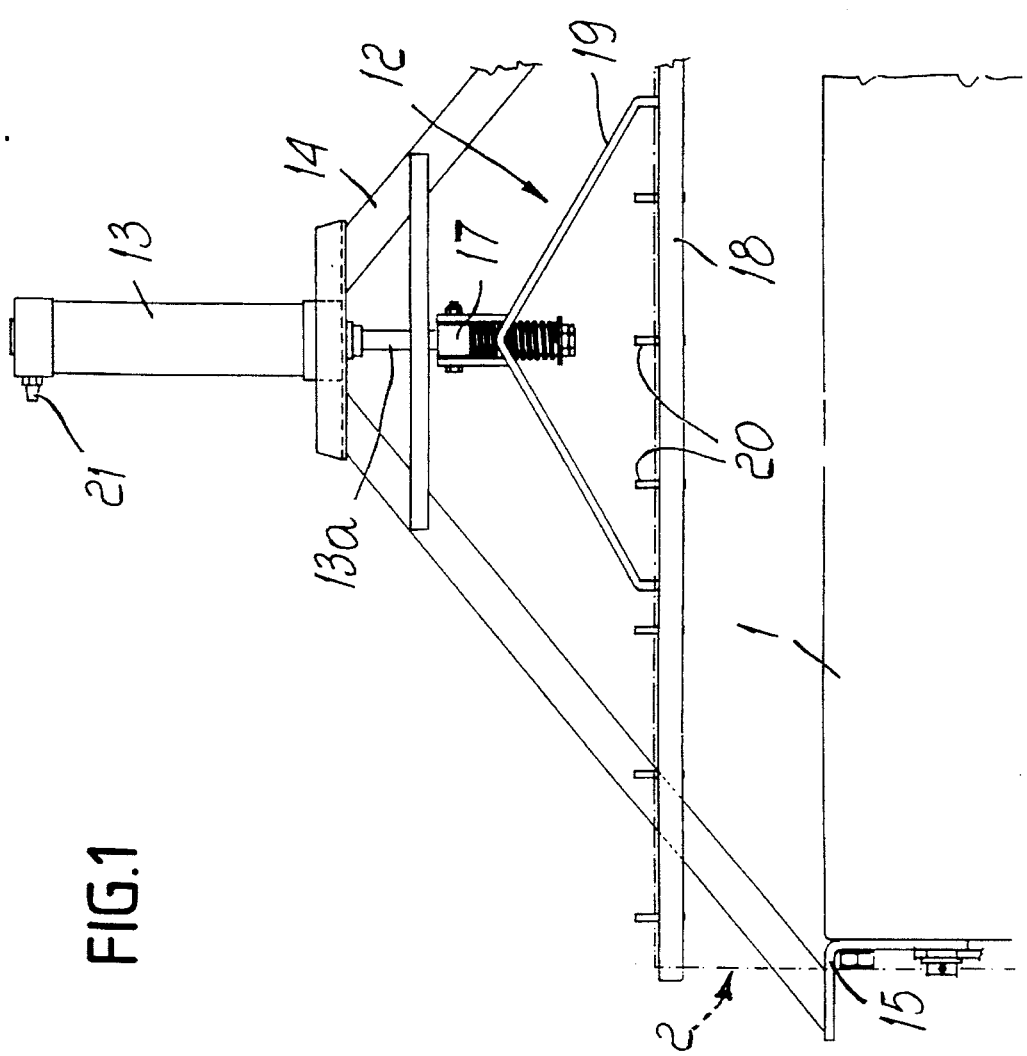
FIG. 1 is a partially cutout front view of an unloading device for filter press according to the present invention.

According to the solution illustrated in FIGS. 1 and 2, the device for unloading the bricks 11 formed by the filtration residues has upper means for supporting the filtering cloths 2 which are constituted by a series of rocker elements 12 which are supported so that they can move vertically by means of a corresponding series of pneumatic or fluid-activated cylinders 13. The cylinders 13 are supported with a vertical axis by a bridge-like frame 14 which is fixed, at its opposite ends, by means of brackets 15, to the sides of a related plate 1. In practice, it is preferred to provide a frame 14, and consequently a cylinder 13, for every two plates 1, in an alternating manner, as shown in FIG. 2.

The stem 13a of the cylinders 13 elastically supports, by virtue of the interposition of a helical spring 16, a cross-member 17 which is arranged longitudinally to the filter press and is provided with a pair of rockers 12 at its ends.

The rockers 12 are constituted by a tubular rod 18 which extends horizontally and transversely to the longitudinal axis of the filter press above the plate 1 and is rigidly coupled to the cross-member 17 by means of a coupling 19. The rod 18 is crossed by a plurality of pins 20 which are uniformly distributed and protrude vertically upward. A pair of filtering cloths 2 is mounted by means of appropriate rings on the pins 20 of each rod 18; said cloths are arranged on the opposite sides of said rod 18, so that they can be associated with the opposite surfaces of a pair of adjacent plates 1; the cloths 2 are retained on the pins 20 by means of respective split pins, not shown, inserted in holes which pass through said pins.

The rockers 12 can move between a raised filtration position, in which the filtering cloths 2 are under tension, and a lowered unloading position, in which an upper portion of said cloths forms a fold which facilitates the separation of the bricks 11.

Conveniently, the descent of the rockers 12 is performed by gravity, by removing pressure from the pneumatic cylinders 13, whereas the return to the raised position in which the filtering cloths 2 are under tension is obtained by feeding compressed air to said cylinders 13. Naturally, the descent rate of the rockers 12 can be adjusted according to the requirements by varying the rate at which the compressed air is vented from the cylinders 13, by means of suitable valve elements 21.

The descent of the rockers 12 into the unloading position is performed in combination with a limited opening of the filtration chambers 7, in practice by the amount sufficient to allow the separation and falling of the related bricks 11.

Preferably, the chambers of the filter press are opened in successive segments of the pack of plates 1, as shown in the Italian utility model application no. 34404 B/90 filed on Feb. 22, 1990 by the same Applicant.

In practice, the plates 1 are mutually concatenated and the end plates of the pack are rigidly coupled to the heads 3 and 4 respectively. The first segment of filtration chambers is opened by moving the movable head 4, while the first plate of the second segment is appropriately locked. Subsequently, a suitable device moves the last plate of the first segment, so as to press together the plates of said first segment and simultaneously pull open the plates of the second segment; the gradual opening of the successive provided segments is performed in a similar manner.

The opening of the filtration chambers allows the falling of the bricks 11 due to gravity; the bricks which remain attached to the cloths 2 are instead separated by the descent of the rockers 12.

At the open filtration chambers, the descent of the rockers 12 in fact slackens the related filtering cloths 2 and forms the above mentioned fold in the upper portion of said cloths, since the cloths, which are no longer stretched, are dragged downward by the weight of the bricks; the loose portion extends in practice up to the collar 2a of the cloths 2.

Therefore, the weight of the bricks 11 bears, when the chambers 7 open, only on the lower portion of the cloths 2, below the collar 2a. This causes the separation of the tiles which have remained attached to the filtering cloths.

After the separation of the bricks, the rockers 12 are returned to the raised position, so as to stretch the filtering cloths 2 again. It is furthermore possible to provide the possibility of performing more than one stroke for the lowering and lifting of the rockers 12, one stroke after the other, when a stronger brick separation action is required.

The descent of the rockers 12 is generally limited to the upper edge of the plates 1. However, it is possible to perform a longer rocker descent stroke, since said rockers can enter the open chambers 7. It should be noted that any descent of the rockers at the closed chambers has no consequences, since said rockers rest on the closed plates 1.

FIG. 1a illustrates a further embodiment of the described device, wherein, for the sake of greater clarity, the corresponding elements have been designated by the same reference numerals. According to this solution, the cylinders 13 are mounted so that their stem 13a is directed vertically upward; the stem 13a elastically supports, by virtue of the interposition of the spring 16, the cross-member 17 which is arranged longitudinally to the filter press and is provided, at its ends, with the couplings 19 of a pair of rockers 12.

The cylinders 13 are supported by a beam 14 which is fixed, at its opposite ends, by means of brackets 15, above a related plate 1. The beam 14 is substantially parallel and close to the upper edge of the corresponding plate 1. In practice, as mentioned, one beam 14, and consequently one cylinder 13, are mounted for every two plates 1 in an alternating manner.

In this case, in the lowered unloading position the rockers 12 extend partially between the open plates 1, as shown in FIG. 1a; descent of the rockers 12 is performed by gravity, removing pressure from the pneumatic cylinders 13. Instead, when compressed air is sent to the cylinders 13, said rockers 12 move to the raised position for stretching the filtering cloths 2, and it is therefore possible to actuate the closure of the filtration chambers by closing the plates 1 in a pack.

Conveniently, it is possible to associate with the couplings 19 a suitable photocell 29 capable of detecting the position in which the rockers 12 are inserted between the plates 1, in said lowered unloading position, so as to prevent an incorrect operation for closing said plates.

This solution has the advantage of significantly limiting the size of the device, and in particular the size of beam 14 is smaller. During transport it is convenient to disassemble the cylinders 13.

This solution is furthermore very easily and rapidly assembled, with a limited number of screw elements needed for this purpose.

In the simplified solution shown in FIGS. 3 and 4, the filtering cloths 2 are supported in an upward position in pairs by a rod 22 with appropriate elastic means 23 interposed. Said rods 22 are supported so that they can slide transversely to a beam 24 which is arranged longitudinally to the filter press and can move vertically by means of a pair of jacks 25 which are arranged at its ends; said jacks 25 are rigidly coupled to the fixed frame of the filter press. The rods 22 are guided on the beam 24 by means of respective sliders 26.

In this case, the filtering cloths 2 are moved simultaneously between the raised filtering position, in which they are stretched, and the lowered position for the unloading of the bricks 11, wherein an upper portion of said cloths is loose. Separation of the bricks obviously occurs at the segment of the filter press whose filtration chambers are open, whereas the descent of the rods 22 has no consequences in the remaining part, since said rods rest on the closed plates 1.

The reciprocating movement of the beam 24 can be repeated several times in order to facilitate the separation of the bricks.

Finally, in the solution shown in FIGS. 5 and 6, the filtering cloths 2 which cover the opposite front surfaces of each plate 1 are suspended in an upward position, by virtue of suitable spring means 27, from a supporting frame 28 which extends above said plates. As seen in the FIGS. 5 and 6, the spring means can comprise springs 27 which are simply interconnected between the upper portion of the supporting frame and an upper portion of each filtering cloth.

The springs 27 keep the cloths 2 under tension when the plates 1 are mutually adjacent in the filtering position (FIG. 5). Instead, when the chambers 7 are opened, the weight of the bricks 11 causes the folding of the upper portion of the cloths 2, whose upper edge is dragged downward by virtue of the extension of the springs 27 (FIG. 6). The springs return the cloth into the stretched position.

This last type of embodiment of the invention is clearly simpler (since it provides only for springs for stretching the filtering cloths) and can be used in cases in which it is not necessary to repeat the descent/ascent of the cloths in order to separate the bricks. Application of the springs alone allows a single cloth descent/ascent operation.

The device thus allows to safely and rapidly unload from the filter press the bricks formed by the filtration residues, without requiring manual interventions. It should be particularly stressed that the bricks are unloaded with a limited opening of the filtration chambers, so as to contain the size of the filter press within a limited size.

In the practical embodiment of the invention, the materials employed, as well as the shapes and dimensions, may be any according to the requirements.

I claim:

1. A filter press with an unloading device for unloading solid residue bricks, the filter press comprising:

a series of mutually aligned plates arranged in a pack and forming a longitudinal duct for feeding liquid to be filtered, the plates having lateral sides provided with central region recesses thereby to form chambers between the mutually aligned plates;

support means for slidably supporting said mutually aligned plates thereby said plates being slidable along a longitudinal direction between on open position in which said chambers are open and accessible between the respective plates and a closed position for filtering in which said chambers are closed;

means for compressing said plates into said closed position; and flexible filtering cloth elements arranged at said lateral sides of said plates;

a series of rod elements arranged above said plates with respect to a supporting surface of the filter press and each supporting a pair of said filtering cloth elements which downwardly extend from a respective rod element towards the supporting surface and between a respective pair of plates;

fluid piston-cylinder means for raising and lowering said rod elements with respect to said supporting surface between a raised position in which the pair of said filtering cloth elements are tensioned between the respective pair of plates and a lowered position in which the pair of filtering cloth elements are slackened thereby to allow solid residue bricks to unload from said chambers when said chambers are open; and connection means interposed between said rod elements and said fluid piston-cylinder means for connecting said rod elements to said fluid piston-cylinder means;

wherein said fluid piston-cylinder means comprise, for a set of a pair of said plates, a pneumatic piston-cylinder supported above said set of a pair of said plates by a bridge frame connected to one of said set of a pair of said plates, said pneumatic piston-cylinder comprising a cylinder and a piston stem extending downwardly from said cylinder towards said set of a pair of said plates, and wherein said connection means comprise, for said set of a pair of said plates:

a cross member extending above and perpendicularly to an extension of a pair of rod elements, said cross member being connected to said piston stem; and a pair of coupling elements each connected to said cross member and extending downwardly therefrom and connected to a respective one of said pair of rod elements;

said piston stem extending downwardly from said cylinder and slidably through said cross member, the filter pressure further comprising a spring surrounding said piston stem and interposed between said cross member and an end abutment element of said piston stem.

2. The filter press with unloading device as claimed in claim 1, further comprising a photocell means for detecting the position of said connection means.

3. The filter press with unloading device as claimed in claim 1, wherein said rod elements are positioned between said respective pair of plates in said lowered position thereof when said respective pair of plates is in said open position.

4. The filter press with unloading device as claimed in claim 3, wherein said rod elements are blocked from descending into said lowered position between said respective pair of plates by said respective pair of plates when said respective pair of plates remain in said closed position thereof.

5. The filter press with unloading device as claimed in claim 1, wherein said rod elements are positioned above said respective pair of plates with respect to the supporting surface in said raised position.

6. A filter press with an unloading device for unloading solid residue bricks, the filter press comprising:

a series of mutually aligned plates arranged in a pack and forming a longitudinal duct for feeding liquid to be filtered, the plates having lateral sides provided with central region recesses thereby to form chambers between the mutually aligned plates;

support means for slidably supporting said mutually aligned plates thereby said plates being slidable along a longitudinal direction between on open position in which said chambers are open and accessable between the respective plates and a closed position for filtering in which said chambers are closed;

means for compressing said plates into said closed position; and flexible filtering cloth elements arranged at said lateral sides of said plates;

a series of rod elements arranged above said plates with respect to a supporting surface of the filter press and each supporting a pair of said filtering cloth elements which downwardly extend from a respective rod element towards the supporting surface and between a respective pair of plates;

fluid piston-cylinder means for raising and lowering said rod elements with respect to said supporting surface between a raised position in which the pair of said filtering cloth elements are tensioned between the respective pair of plates and a lowered position in which the pair of filtering cloth elements are slackened thereby to allow solid residue bricks to unload from said chambers when said chambers are open; and connection means interposed between said rod elements and said fluid piston-cylinder means for connecting said rod elements to said fluid piston-cylinder means, wherein said fluid piston-cylinder means comprise, for a set of a pair of said plates, a pneumatic piston-cylinder supported above said set of a pair of said plates by a bridge frame connected to one of said set of a pair of said plates, said pneumatic piston-cylinder comprising a cylinder and a piston stem extending upwardly from said cylinder away from said set of a pair of said plates, and wherein said connection means comprise, for said set of a pair of said plates:

a cross member extending above and perpendicularly to an extension of a pair of rod elements, said cross member being connected to said piston stem; and a pair of coupling elements each connected to said cross member and extending downwardly therefrom and connected to a respective one of said pair of rod elements;

said piston stem extending upwardly from said cylinder and slidably through said cross member, the filter press further comprising a spring surrounding said piston stem and interposed between said cross member and a mid-abutment element of said piston stem.

7. The filter press with unloading device as claimed in claim 6, further comprising a photocell means for detecting the position of said connection means.

8. The filter press with unloading device as claimed in claim 6, wherein said rod elements are positioned between said respective pair of plates in said lowered position thereof when said respective pair of plates is in said open position.

9. The filter press with unloading device as claimed in claim 8, wherein said rod elements are blocked from descending into said lowered position between said respective pair of plates by said respective pair of plates when said respective pair of plates remain in said closed position thereof.

10. The filter press with unloading device as claimed in claim 6, wherein said rod elements are positioned above said respective pair of plates with respect to the supporting surface in said raised position.

* * * * *